(12) United States Patent
Schalk et al.

(10) Patent No.: US 11,562,337 B2
(45) Date of Patent: Jan. 24, 2023

(54) PRINTING DEVICE FUNCTIONALITY BASED ON CONSUMPTION AND PAYMENT

(71) Applicant: Hewlett-Packard Development Company, L.P., Spring, TX (US)

(72) Inventors: Wesley R. Schalk, Vancouver, WA (US); Jesse Otto Sutherland, Vancouver, WA (US); Erik A. Anderson, Vancouver, WA (US); Jefferson P. Ward, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 40 days.

(21) Appl. No.: 17/054,824

(22) PCT Filed: Aug. 24, 2018

(86) PCT No.: PCT/US2018/047909
§ 371 (c)(1),
(2) Date: Nov. 12, 2020

(87) PCT Pub. No.: WO2020/040784
PCT Pub. Date: Feb. 27, 2020

(65) Prior Publication Data
US 2021/0241245 A1 Aug. 5, 2021

(51) Int. Cl.
*G06Q 20/14* (2012.01)
*G05B 15/02* (2006.01)
(Continued)

(52) U.S. Cl.
CPC .......... *G06Q 20/145* (2013.01); *G05B 15/02* (2013.01); *G06F 3/1203* (2013.01);
(Continued)

(58) Field of Classification Search
CPC .. G06Q 20/145; G06Q 10/083; G06Q 10/087; G06Q 20/407; G06Q 30/0283;
(Continued)

(56) References Cited

U.S. PATENT DOCUMENTS 5,613,160 A 3/1997 Kraslavsky et al.
5,825,377 A 10/1998 Gotoh et al.
(Continued)

FOREIGN PATENT DOCUMENTS

EP 1100003 A2 * 5/2001 ........... G06F 3/1207
EP 1233331 A2 * 8/2002 ........... G06F 21/608
(Continued)

OTHER PUBLICATIONS

M. Kalochristianakis, K. Grammatikakis, M. Saldaris, I. Demesoukas and G. Tzanodaskalakis, "The Concept and Design of an Open Integrated Print Charging System," in IEEE Systems Journal, vol. 7, No. 4, pp. 692-699, Dec. 2013, doi: 10.1109/JSYST.2012. 2223514. (Year: 2013).*

(Continued)

*Primary Examiner* — Ashford S Hayles
(74) *Attorney, Agent, or Firm* — Michael Dryja

(57) ABSTRACT

Examples for determining printing device functionality based on consumption and payment are described herein. In some examples, signals indicative of an amount of utilized print consumable by a printing device and signals indicative of payment for the amount of utilized print consumable are received at a computing device. Signals to cause the printing device to alter a functionality based on the signals indicative of an amount of utilized print consumable and the signals indicative of payment for the amount of utilized print consumable are transmitted by the computing device.

18 Claims, 8 Drawing Sheets

(51) Int. Cl.
  *G06F 3/12*       (2006.01)
  *G06Q 10/08*      (2012.01)
  *G06Q 20/40*      (2012.01)
  *G06Q 30/02*      (2012.01)
  *G06Q 30/04*      (2012.01)
  *G06Q 40/02*      (2012.01)
  *G06Q 30/00*      (2012.01)

(52) U.S. Cl.
  CPC .......... *G06F 3/1229* (2013.01); *G06F 3/1239* (2013.01); *G06Q 10/083* (2013.01); *G06Q 10/087* (2013.01); *G06Q 20/407* (2013.01); *G06Q 30/0283* (2013.01); *G06Q 30/04* (2013.01); *G06Q 40/02* (2013.01); *G06Q 30/01* (2013.01)

(58) Field of Classification Search
  CPC ........ G06Q 30/04; G06Q 40/02; G06Q 30/01; G06Q 20/18; G06Q 30/06; G05B 15/02; G06F 3/1203; G06F 3/1229; G06F 3/1239; G07F 17/26; G07F 17/266; G07G 5/00
  See application file for complete search history.

(56) References Cited

U.S. PATENT DOCUMENTS

| | | | | |
|---|---|---|---|---|
| 5,923,016 A * | 7/1999 | Fredregill | ............ | G07G 1/0036 902/22 |
| 6,516,157 B1 | 2/2003 | Maruta et al. | | |
| 6,763,336 B1 * | 7/2004 | Kolls | ............ | G06Q 30/06 705/44 |
| 7,124,094 B1 * | 10/2006 | Kobayashi | ............ | G06Q 20/382 705/317 |
| 7,430,605 B2 * | 9/2008 | Quach | ............ | G06Q 10/10 358/1.13 |
| 8,873,083 B2 | 10/2014 | Pant et al. | | |
| 9,213,987 B2 | 12/2015 | Shiraiwa et al. | | |
| 9,633,382 B2 * | 4/2017 | Kim | ............ | G06Q 30/04 |
| 9,715,645 B2 | 7/2017 | Mccoog | | |
| 2002/0042747 A1 | 4/2002 | Istvan | | |
| 2002/0049638 A1 * | 4/2002 | Ito | ............ | G06Q 30/0635 705/26.81 |
| 2002/0091585 A1 * | 7/2002 | Asauchi | ............ | G06Q 10/087 705/28 |
| 2002/0105668 A1 * | 8/2002 | Lilland | ............ | B41J 2/17566 358/1.14 |
| 2002/0194064 A1 * | 12/2002 | Parry | ............ | G06Q 30/02 705/14.24 |
| 2003/0046171 A1 * | 3/2003 | Whale | ............ | G03G 15/0865 705/26.8 |
| 2003/0088476 A1 | 5/2003 | Simpson et al. | | |
| 2003/0090705 A1 * | 5/2003 | Ferlitsch | ............ | G06Q 20/4037 358/1.18 |
| 2003/0097310 A1 * | 5/2003 | Ono | ............ | G06Q 30/02 705/14.27 |
| 2003/0151635 A1 * | 8/2003 | Naka | ............ | B41J 2/17546 399/24 |
| 2003/0172086 A1 | 9/2003 | Parry | | |
| 2003/0200160 A1 * | 10/2003 | Aruga | ............ | G06Q 10/087 705/28 |
| 2003/0202204 A1 * | 10/2003 | Terrill | ............ | G06Q 10/087 399/24 |
| 2004/0158661 A1 | 8/2004 | Mokuya | | |
| 2004/0233472 A1 | 11/2004 | Gassho et al. | | |
| 2004/0249733 A1 * | 12/2004 | Clough | ............ | G06Q 30/06 705/34 |
| 2005/0049967 A1 * | 3/2005 | Currans | ............ | G07F 7/02 705/39 |
| 2005/0147440 A1 * | 7/2005 | Nakanishi | ............ | G06K 15/1823 400/62 |
| 2005/0192817 A1 * | 9/2005 | Sorenson | ............ | G06Q 30/0603 705/26.1 |
| 2005/0273403 A1 * | 12/2005 | Nguyen | ............ | G06Q 40/12 705/30 |
| 2006/0020561 A1 * | 1/2006 | Kodimer | ............ | G07F 17/26 705/400 |
| 2006/0069647 A1 * | 3/2006 | Cozianu | ............ | G06Q 40/02 705/52 |
| 2006/0095280 A1 | 5/2006 | Gooding | | |
| 2006/0120735 A1 * | 6/2006 | Adkins | ............ | G03G 21/02 399/27 |
| 2006/0200735 A1 * | 9/2006 | Ormond | ............ | G06Q 20/18 715/234 |
| 2007/0088613 A1 * | 4/2007 | Adkins | ............ | G06Q 10/06 705/21 |
| 2007/0097161 A1 | 5/2007 | Ejiri et al. | | |
| 2007/0174218 A1 * | 7/2007 | Kojima | ............ | G06Q 20/18 705/410 |
| 2008/0010211 A1 * | 1/2008 | Ferraro | ............ | G07B 17/00508 705/405 |
| 2008/0027875 A1 * | 1/2008 | Adkins | ............ | G06Q 30/02 705/76 |
| 2008/0071626 A1 * | 3/2008 | Hill | ............ | G06Q 20/203 705/22 |
| 2008/0183630 A1 * | 7/2008 | Stephenson | ............ | G07F 17/0014 705/75 |
| 2009/0006247 A1 * | 1/2009 | Hansen | ............ | G06Q 30/02 707/999.107 |
| 2009/0066985 A1 * | 3/2009 | Ferlitsch | ............ | G06Q 10/107 455/406 |
| 2009/0070276 A1 * | 3/2009 | Kodimer | ............ | G06Q 30/0283 705/400 |
| 2009/0192910 A9 * | 7/2009 | Rankin | ............ | G06Q 30/0601 705/26.1 |
| 2009/0248578 A1 * | 10/2009 | Pollock | ............ | G06Q 30/06 705/64 |
| 2009/0257759 A1 * | 10/2009 | Shustef | ............ | G03G 15/55 399/79 |
| 2010/0039669 A1 * | 2/2010 | Chang | ............ | G10L 15/30 358/1.15 |
| 2010/0067036 A1 * | 3/2010 | Oka | ............ | G06Q 30/04 358/1.14 |
| 2010/0196075 A1 * | 8/2010 | Tredoux | ............ | G06F 3/1291 400/76 |
| 2010/0253968 A1 * | 10/2010 | Nuggehalli | ............ | G06F 3/1285 358/1.15 |
| 2010/0264214 A1 * | 10/2010 | Gnanasambandam | ............ | G06Q 10/087 235/382 |
| 2010/0268591 A1 * | 10/2010 | Gnanasambandam | ............ | G06Q 20/145 705/41 |
| 2011/0011929 A1 * | 1/2011 | Padua | ............ | G06Q 30/0283 705/34 |
| 2011/0188068 A1 * | 8/2011 | Jones | ............ | G06Q 30/018 705/317 |
| 2011/0191198 A1 * | 8/2011 | Rise | ............ | G06Q 30/0601 705/26.1 |
| 2011/0191212 A1 * | 8/2011 | Iburg | ............ | G06Q 30/0283 705/28 |
| 2011/0295729 A1 * | 12/2011 | Kim | ............ | G06Q 30/04 705/34 |
| 2011/0302062 A1 * | 12/2011 | Kim | ............ | G06Q 30/04 705/400 |
| 2012/0254050 A1 * | 10/2012 | Scrafford | ............ | G06Q 10/00 705/318 |
| 2016/0162234 A1 | 6/2016 | Fernandes et al. | | |
| 2016/0288515 A1 * | 10/2016 | Matsuda | ............ | G06K 15/4075 |
| 2017/0161719 A1 | 6/2017 | Bhatia | | |
| 2017/0186020 A1 * | 6/2017 | Kodmer | ............ | G06Q 30/018 |
| 2018/0267752 A1 | 9/2018 | Nishiwaki et al. | | |

FOREIGN PATENT DOCUMENTS

| | | |
|---|---|---|
| EP | 1100003 A3 | 5/2004 |
| JP | 2000-309147 A | 11/2000 |
| JP | 2002326375 A | 11/2002 |
| JP | 4574461 B2 * | 11/2010 ......... G03G 15/5079 |

(56) References Cited

FOREIGN PATENT DOCUMENTS

| | | | |
|---|---|---|---|
| JP | 6372242 | B2 * | 8/2018 |
| RU | 2197717 | C2 | 1/2003 |
| RU | 2258010 | C2 | 8/2005 |

OTHER PUBLICATIONS https://ip.com/IPCOM/000226896 (Year: 2013).*
https://ip.com/IPCOM/000210860 (Year: 2011).*

* cited by examiner

PRINTING DEVICE FUNCTIONALITY BASED ON CONSUMPTION AND PAYMENT

BACKGROUND

Printing devices may consume a print consumable, which may include a print substance (e.g., ink, toner, etc.), supplies, kits and/or components. A service provider may provide the print consumable to an end-user for use by a printing device. Service providers may offer, among other things, printing devices and print consumables to customers.

BRIEF DESCRIPTION OF THE DRAWINGS

Various examples will be described below by referring to the following figures.

Figure 1:
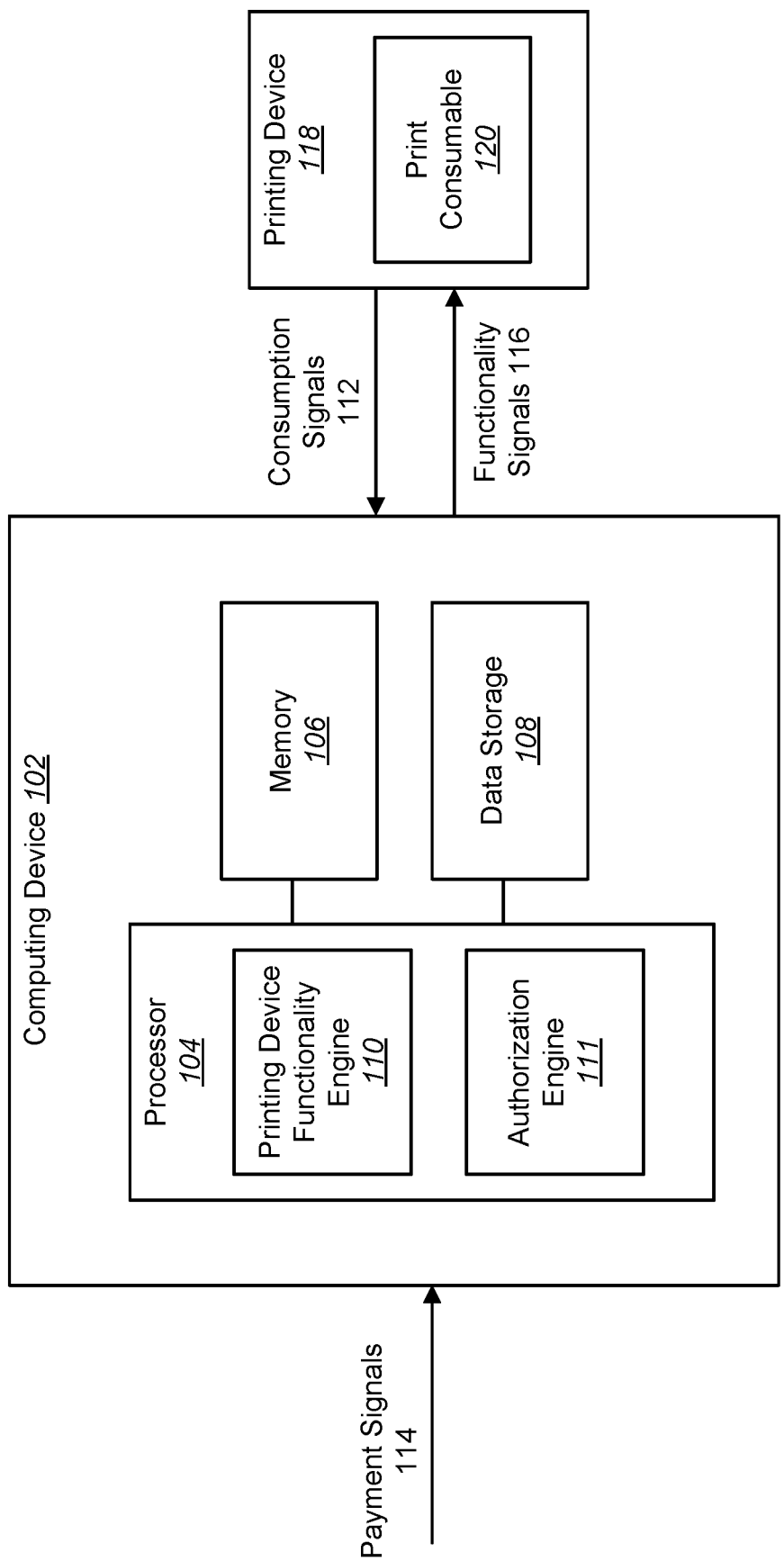
FIG. 1 is an example block diagram of a computing device for determining printing device functionality based on consumption and payment.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Printing devices—including printers, copiers, fax machines, multifunction devices including additional scanning, copying, and finishing functions, all-in-one devices, pad printers to print images on three dimensional objects, and three-dimensional printers (additive manufacturing devices)—consume print consumables. As used herein, a print consumable may include a material that is utilized during printing operations.

In some examples, the print consumable may include a print substance. In general, printing devices apply a print substance, which can include printing agents or colorants, to a substrate. A substrate is a superset of print media, such as plain paper, and can include any suitable object or materials to which a print substance from a printing device are applied including materials, such as powdered build materials, for forming three-dimensional articles. Print substances, including printing agents and colorants, are a superset of inks and can include toner, liquid inks, or other suitable marking material that may or may not be mixed with fusing agents, detailing agents, or other materials and can be applied to the substrate.

In other examples, the print consumable may include non-print substance materials. For example, a print consumable may include printing supplies (e.g., media, paper, etc.), printing device kits (e.g., conversion kits, reservoir extraction kits, etc.), and/or components (e.g., wipers) that are depleted to some extent during printing operations.

In some aspects, this disclosure describes systems and methods for refilling and authorization for a fleet of printing devices by issuing a license from a service provider to an end-user (e.g., customer). As used herein, a service provider may include an individual, entity or organization that provides print services to an end-user. Examples of a service provider include a dealer, supplier and/or print consumable manufacturer.

Current approaches do not include supply authentication for a print consumable. Additionally, in current approaches, shipping and handling for a print consumable may be charged for separate supplies.

Other challenges may occur in the context of a common supply of a print substance used to refill multiple printing devices in a fleet of printing devices. For example, a common print consumable supply may be used to replace ink or toner cartridges with high capacity containers that refill (e.g., top-off or partially refill) high capacity reservoirs integrated within printing devices. The containers may be universal and can be used to refill multiple and diverse ranges of printing devices (e.g., A4, A3, plotters, etc.) that use the same print substance.

The common print consumable supply may also refill printing devices distributed across multiple locations, customer sites and customers. A common print consumable supply may be desirable for potentially lowering the cost to deliver a print consumable while reducing rates of intervention by a service provider and/or end-user.

Examples of methods for refilling a fleet of print devices from a universal set of consumable supplies are described herein. In some examples, print consumable supplies may be licensed as part of a contract to a customer. For instance, a service provider may sell discounted printing devices to dealers or a customer under a contract that includes provisions regarding ownership of the title to a print consumable supply, authorized use of supplies and printing devices, consumption reporting, supplies fulfillment, service terms, audit rights, warranty and damages. In this approach, the service provider may retain ownership of the title to the print consumable. An end-user may be allowed to consume the print consumable, such as under terms of an agreement, without acquiring ownership of the title. Such an arrangement may be beneficial to both parties. For instance, in one example case, payment may be made by an end-user, such as after a reporting period, for the print consumable consumed. The amount paid may be less than what would have been paid had the end-user acquired ownership of the title of print consumables. Similarly, the service provider may find benefit in an agreement that the end-user will continue to use services provided by the service provider for an agreed-upon period of time. Of course, these are but examples provided to illustrate possible implementations and effects thereof, consistent with claimed subject matter.

To order new supplies, shipping and handling fees may be collected and proof of print consumable consumption may be verified. Consumption reporting may be implemented based on a number of print operations or based on the volume of utilized print consumable. This provides the basis for invoicing for the use of the print consumable.

Several factors may determine the print consumable cost. For example, the print consumable cost may be based on the printing device hardware, the media size, the print mode, the coverage of ink on the page, unique pricing for a specific customer, etc. The print consumable that is consumed by printing may be charged to an end-user.

In some examples, a key (e.g., in the form of a physical structure, physical charges or states stored in non-transitory memory, etc.) may be provided to enable continued operation of the printing device after a set period. In other examples, functionality may be added to the printing device upon confirmation of consumption and payment of a print consumable.

In some examples, empty supplies of a print consumable may be recycled or returned to the service provider. Lost supplies may incur a penalty fee and unused amounts of a print consumable or empty print consumable containers may be returned to the service provider or a lost bottle fee may be assessed to the customer.

As described herein, customers may report consumption of a print consumable (e.g., ink, toner, supplies, kits, components) from a printing device via the cloud (e.g., internet) or manually to a computing device of the service provider. The computing device may invoice customers for consumption covering shipping & handling, print operations, lost bottle penalties and credit for returned supplies. The customer may then pay for the used print consumable.

In some examples, claimed subject matter may reduce complexity and inventory costs associated with multiple dedicated cartridges. In other examples, a customer may order additional supply based on consumption and empty bottles may be recycled or re-used. In some examples, the supplies of print consumable may be licensed rather than sold, which may enhance a service provider's ability to capture profits from specific market segments or customers using a common print consumable supply. Furthermore, in some examples, the described systems and methods may reduce financial risk for a service provider as the consumption reporting may unlock replacement supply ordering and shipping and handling fees offset the cost of supplies.

In some examples, shipping and handling fees may be determined based on a number of parameters. A computing device may combine knowledge of consumption reporting from the printing device(s) with other parameters to determine shipping and handling fees. These parameters may include historical consumption reporting from the same printing device(s); historical consumption reporting from other printing devices with similar consumption data profiles; weather forecast information; seasonality information; and/or news of road construction, delivery service strikes, protests, etc. Additionally, shipping and handling fees may be optimized by comingling shipments from multiple print devices all managed by a single service provider, and/or utilizing an online bidding system for deliveries.

FIG. 1 is an example block diagram of a computing device 102 for determining printing device functionality based on consumption and payment. In some examples, the computing device 102 may be a computer (e.g., desktop computer, laptop computer, server, etc.). In other examples, the computing device 102 may be a distributed set of devices. For example, the computing device 102 may include multiple discrete devices organized in a system to implement the processes described herein.

The computing device 102 includes a processor 104. The processor 104 may be any of a central processing unit (CPU), a microcontroller unit (MCU), a semiconductor-based microprocessor, GPU, FPGA, an application-specific integrated circuit (ASIC), and/or other hardware devices suitable for retrieval and execution of instructions stored in the memory 106. The processor 104 may fetch, decode, and execute instructions, stored on the memory 106 and/or data storage 108, to implement printing device functionality based on consumption and payment.

The memory 106 may include read only memory (ROM) and/or random access memory (RAM). The memory 106 and the data storage 108 may also be referred to as a machine-readable storage medium. A machine-readable storage medium may be any electronic, magnetic, optical, or other physical storage device that contains or stores executable instructions. Thus, the machine-readable storage medium may be, for example, RAM, EEPROM, a storage device, an optical disc, and the like. In some examples, the machine-readable storage medium may be a non-transitory machine-readable storage medium, where the term "non-transitory" does not encompass transitory propagating signals. The machine-readable storage medium may be encoded with instructions that are executable by the processor 104.

The computing device 102 may include additional components (not shown). In addition, components disclosed herein may be internal to the computing device 102.

Challenges may occur when a print consumable 120 enters the marketplace. In some examples, a service provider (e.g., print consumable manufacturer, dealer, supplier) loses control of supplies as they are sold. As used herein, "loss of control" may include unintended use of a supply or print consumable 120. In other examples, customers receiving a print consumable 120 may be exposed to a financial liability (e.g., upfront costs). Therefore, challenges associated with distribution of a print consumable 120 include balancing costs between a service provider and a customer and maintaining supply control by the service provider.

As described herein, these challenges may be mitigated by using reports on print consumable consumption and payment to determine the functionality of a printing device 118. Furthermore, additional supplies of a print consumable 120 may be shipped once previously-shipped supplies are confirmed (1) consumed, and (2) paid for.

The computing device 102 may receive consumption signals 112 indicative of an amount of utilized print consumable 120 by a printing device 118. For example, the printing device 118 may periodically report consumption of a print consumable 120 automatically (e.g., via the internet). In another example, the consumption of the print consumable 120 may be manually reported (e.g., by a customer or service provider) to the computing device 102.

In some examples in which a plurality of printing devices, such as printing device 118, share print consumables, such as print consumable 120, a subset of the plurality of printing devices may not be connected to a network, such as a wide area network (WAN) like the Internet. Because there may nevertheless be a desire to track print consumable usage, each printing device (such as printing device 118 in FIG. 1) may record consumption data to a memory device affixed to a container of print consumable (e.g., print consumable 120). This consumption data may be collected from each printing device when the print consumable mates with a printing device. Then, consumption signals, such as consumption signals 112, that include the consumption data of the printing devices may be transmitted to the computing device 102 by installing the container of print consumable in an internet-connected printing device.

At times, there may be a desire to protect information, such as signals indicative of an amount of utilized print consumable, as it is stored and/or transmitted. Thus, in some examples, the transmitted consumption signals 112 may be protected against tampering using cryptographic authentication. For example, cryptographic authentication of consumption signals 112 may be used when printing devices are internet connected. Among other things, such an approach may avoid the likelihood of fraud and errors involved in manually reporting consumption signals 112.

The consumption signals 112 may include information about an amount of print consumable 120 utilized by a printing device 118. In some examples, the print consumption may be indicated on a page basis. For example, a printing device 118 may send a consumption signal 112 that includes a number of parameters including the number of pages printed and/or the print mode used. In some examples, the print consumption may be indicated in the consumption signals 112 on a volume basis. For example, a printing device 118 may send a consumption signal 112 that includes a volume (e.g., milliliters) of print substance used.

The computing device 102 may also receive payment signals 114 indicative of payment for the amount of utilized print consumable 120. For example, a customer or dealer may pay or may not pay for the utilized print consumable 120. The computing device 102 may receive the payment signals 114 confirming that the amount of used print consumable 120 has been paid for or indicating that the amount of used print consumable 120 has not been paid for. It should be noted that the amount of utilized print consumable 120 may be consumed by the printing device 118 before a user provides payment.

The processor 104 may implement a printing device functionality engine 110. As used herein, the term "engine" refers to a combination of hardware (e.g., a processor 104) and executed instructions, such as may be stored in a computer readable medium and fetched and executed by the hardware (e.g., processor 104).

The printing device functionality engine 110 may determine how to alter functionality of the printing device 118 based on the consumption signals 112 and the payment signals 114. As used herein, "functionality" may include, but is not necessarily limited to, new technology. For example, the printing device functionality engine 110 may add print features to the printing device 118 in response to receiving the consumption signals 112 and payment signals 114.

In some examples, the printing device functionality engine 110 may add premium features to the printing device 118. Examples of added features may include faster printing, customized color maps, more print modes, fax capability, network storage/backup of print/scan files, predictive failure detection etc. As used herein, a "print mode" may refer to a combination of paper type, print quality level (e.g. draft mode for maximum speed or minimum cost with trade-offs for print quality; normal mode that optimizes print quality, speed and cost; or best mode for maximum print quality), halftoning (e.g., dither matrix, error diffusion), print speed, color or monochrome printing and/or print substance (e.g., ink, toner) density per unit area. Different combinations of these variables may result in a change in print mode. Additionally, added print features may include real-time, high accuracy continuous print substance reservoir level detection; faster print substance refill; and/or extraction of a remaining print substance 120 in a reservoir in circumstances such as, for example, end of a customer contract, end of printer life, etc. Added print features may also include enhanced print modes; lower print substance refill intervention rates; and/or printer diagnostics information.

In some examples, the printing device functionality engine 110 may limit features in response to failing to receive consumption signals 112 and/or payment signal 114. For example, the printing device functionality engine 110 may limit available print modes for the printing device 118.

In some examples, the consumption signals 112 may indicate that the printing device 118 may have used an unknown print consumable 120. For example, the consumption signals 112 may indicate that the print consumable 120 is uncertified for use in the printing device 118. In response to receiving consumption signals 112 indicative of an unknown print consumable 120, the printing device functionality engine 110 may add print features to the printing device 118 to accommodate the unknown print consumable 120. For example, the printing device functionality engine 110 may configure the printing device 118 to operate in a low accuracy ink level sense mode (e.g., due to different ink characteristics, an unknown ink may be less accurate). In another example, the printing device functionality engine 110 may configure the printing device 118 to add dry time to the print process due to the unknown ink characteristics.

Altering the functionality of the printing device 118 may improve the performance of the printing device 118 when using an unknown print consumable 120. For example, certain print substances may entail more frequent ink spitting, maintenance and/or recirculation, such as to reduce negative ink-related effects to print heads which may reduce print quality, by way of non-limited example. The printing device functionality engine 110 may add features to the printing device 118 to safely accommodate the unknown print consumable 120.

The computing device 102 may transmit functionality signals 116 to cause the printing device 118 to alter functionality. For example, upon determining whether to alter the functionality of the printing device 118, the computing device 102 may transmit functionality signals 116 to the printing device 118. The functionality signals 116 may include the determined functionality for the printing device 118. Upon receiving the functionality signal 116, the printing device 118 may apply the functionality indicated by the functionality signal 116.

The computing device 102 may also include an authorization engine 111. The authorization engine 111 may authorize or cancel shipment of an additional amount of print consumable 120 based on the consumption signals 112 and payment signals 114. For example, the authorization engine 111 may authorize shipment of an additional amount of print consumable 120 in response to confirming consumption and payment for the amount of utilized print consumable 120. In an example, before authorizing shipment of an additional amount of print consumable 120, the authorization engine 111 may determine that an amount of print consumable 120 was used based on the consumption signals 112. The authorization engine 111 may determine that the utilized print consumable 120 was paid for based on the payment signals 114.

In some examples, the authorization engine 111 may determine a deposit amount for the additional amount of print consumable 120 based on the consumption signals 112 indicative of an amount of utilized print consumable 120. For example, the authorization engine 111 may determine a deposit amount to cover shipping and handling of the additional amount of print consumable 120.

The authorization engine 111 may cancel shipment of an additional amount of print consumable 120 in response to failure to receive one of the consumption signals 112 or payment signals 114. For example, if the printing device 118 fails to send its consumption information to the computing device 102 via the consumption signals 112, then the authorization engine 111 may cancel or reject shipment of an additional amount of print consumable 120. Similarly, if the printing device 118 fails to receive payment signals 114 indicating payment for the amount of utilized print consumable 120, then the authorization engine 111 may cancel or reject shipment of an additional amount of print consumable 120.

In some examples, the authorization engine 111 may cancel shipment of an additional amount of print consumable 120 in response to determining that an unknown print consumable 120 is used by the printing device 118. As described above, the consumption signals 112 may indicate that the printing device 118 is using an unknown print consumable 120. In response to the unknown print consumable 120, the authorization engine 111 may cancel or reject shipment of an additional amount of print consumable 120. In an example, the computing device 102 may hold back the print consumable 120 (e.g., ink) from a dealer if an unauthorized or unknown print consumable 120 is in the supply chain.

In some examples, the authorization engine 111 may cancel shipment of an additional amount of print consumable 120 in response to failure to consume the print consumable 120 by the printing device 118. To avoid over-ordering or stockpiling of a print consumable 120 or diversion of the print consumable 120 from a customer to a third party, the authorization engine 111 may cancel a shipment request if the consumption signals 112 indicate that the printing device 118 has not used a threshold amount of print consumable 120 within a time period. Furthermore, it may be desirable to prevent customers from over-ordering print consumables 120 due to issues with expiration (e.g., ink expiration) and the potential to use the print consumables 120 for unintended purposes.

In some examples, the authorization engine 111 may determine an amount of print consumable 120 to ship based on the consumption signals 112. For example, the authorization engine 111 may authorize a shipment of an additional amount of print consumable 120 that is approximately equal to the amount of print consumable 120 reported used in the consumption signals 112. In this manner, excess inventory of print consumables 120 may be avoided where too much print consumable 120 is shipped for the amount of usage by the printing device 118.

In some examples, the authorization engine 111 may determine that an amount of unused print consumable 120 is to be retrieved based on the consumption signals 112 and the payment signals 114. For example, if the consumption signals 112 indicate that the printing device 118 has not used the print consumable 120 within a certain time period and the payment signals 114 indicate that payment for the print consumable 120 has not been received, then the authorization engine 111 may issue a message to retrieve the unused print consumable 120. In another example, the authorization engine 111 may determine to retrieve unused print consumables 120 for reasons other than non-payment (e.g., end-of-contract). The authorization engine 111 may send a message to a dealer or supplier to retrieve the unused print consumable 120.

In some examples, the authorization engine 111 may invoice for the amount of utilized print consumable 120 based on the consumption signals 112 and the payment signals 114. For example, the authorization engine 111 may generate a statement requesting payment for any amount of print consumable 120 that has not been paid for by the customer. In some examples, the authorization engine 111 may apply a partial credit to used print consumables 120 to carry a customer over to subsequent payment periods.

Figure 2:
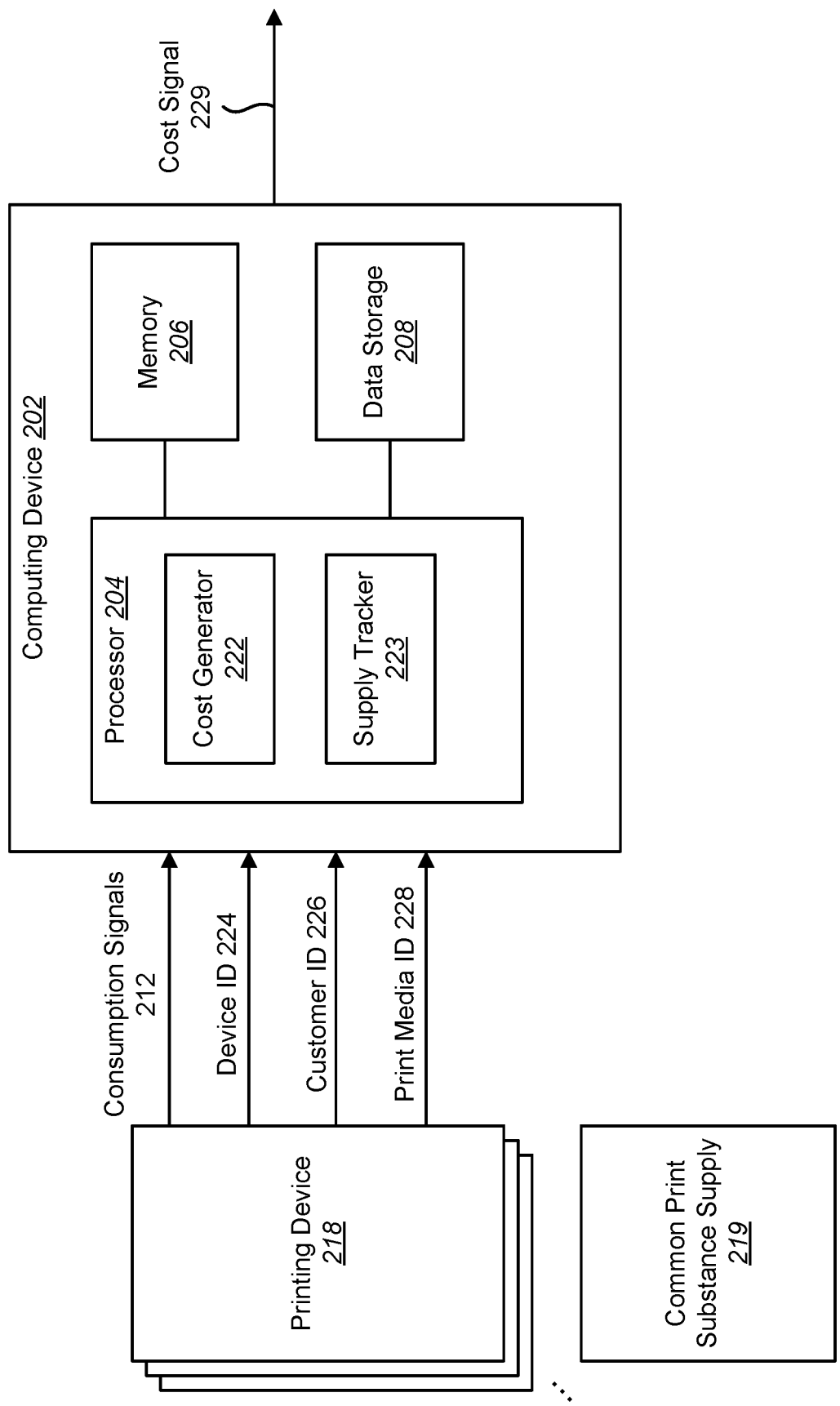
FIG. 2 is an example block diagram of a computing device for cost generation for a common print substance supply.

FIG. 2 is an example simplified block diagram of a computing device 202 for cost generation for a common print substance supply 219. In some examples, the computing device 202 may be a computer (e.g., desktop computer, laptop computer, server, etc.). In other examples, the computing device 202 may be a distributed set of devices. For example, the computing device 202 may include multiple discrete devices organized in a system to implement the processes described herein. The computing device 202 may include a processor 204, memory 206 and data storage 208, which may be implemented in accordance with the computing device 102 of FIG. 1.

In some examples, a common print substance supply 219 may be used to fill a plurality of printing devices 218 with a print substance. The common print substance supply 219 may include a reservoir (e.g., bottle) containing an amount of a print substance (e.g., ink, toner, etc.). A connector of the common print substance supply 219 may interface with multiple printing devices 218. The common print substance supply 219 may be used to fill a print substance in a reservoir of a printing device 218.

A single common print substance supply 219 may be used to fill a plurality of printing devices 218 with a print substance. In some examples, the printing devices 218 may be different types of printing devices. In other examples, the printing devices 218 may belong to different customers or may be located in different locations. In yet other examples, the printing devices 218 may use different print modes or different print media.

The use of a common print substance supply 219 presents different challenges. For example, one challenge for a service provider includes how to recoup expenses across different products, users (e.g., customers), locations, modes, etc. Another challenge for service providers using a common print substance supply 219 includes providing dedicated supply warehousing for many (e.g., thousands) of stock keeping units (SKUs) across regions. Yet another challenge associated with the use of a common print substance supply 219 is customer unawareness of print substance replenishment from a common print substance supply 219. As described herein, these challenges may be mitigated through consumption monitoring and billing after-the-fact on a per consumption basis.

The processor 204 may implement a cost generator 222. The cost generator 222 may receive various signals from the plurality of printing devices 218. The cost generator 222 may receive consumption signals 212 indicative of an amount of print substance consumed by the plurality of printing devices 218. For example, each printing device 218 may periodically report consumption signals 212 automatically (e.g., via the internet) or manually reported (e.g., by a customer or service provider).

The consumption signals 212 may include information about the amount of print substance (e.g., ink, toner, etc.) consumed by the printing device 218. In some examples, the print substance consumption may be indicated on a page basis. For example, a printing device 218 may send a consumption signal 212 that includes a number of parameters including the number of pages printed and/or the print mode used. The cost generator 222 may determine an amount of print substance consumed by a printing device 218 based on these parameters. In some implementations, the cost generator 222 may infer the amount of print substance consumption based on a mapping of the consumption parameters included in the consumption signals 212 to expected print substance consumption.

In some examples, the print substance consumption may be indicated in the consumption signals 112 on a volume basis. For example, a printing device 218 may send a consumption signal 212 that includes a volume (e.g., milliliters) of print substance used.

The cost generator 222 may also receive a device identifier (ID) 224 from the plurality of printing devices 218. The device ID 224 may indicate a given printing device 218 in the plurality of printing devices 218. For example, the device ID 224 may include the model and/or serial number of a given printing device 218.

The cost generator 222 may also receive a customer ID 226 from the plurality of printing devices 218. The customer ID 226 may indicate a given customer of a subset of the plurality of printing devices 218. For example, a number of printing devices 218 may belong to a given customer. The customer ID 226 may indicate that this subset of printing devices 218 may be associated with the given customer.

The cost generator 222 may also receive a print media ID 228 from the plurality of printing devices 218. The print media ID 228 may indicate the print media used by the plurality of printing devices 218. For example, the print media ID 228 may indicate the page size, media type or other parameters associated with the print media.

The cost generator 222 may generate, based on the received signals, cost signals 229 indicative of a cost corresponding to the amount of print substance consumed by each printing device 218 of the plurality of printing devices 218. The cost may also be generated based on the device ID 224, the customer ID 226, the print media ID 228, or a combination thereof.

The cost generator 222 may generate costs for each printing device 218 in the plurality of printing devices 218. It should be noted that these individual costs could be the same or different.

In some examples, the individual cost for a given printing device 218 may be generated on a page basis. For example, the cost-per-page may be based on the number of printed pages, printed page sizes, an end-user (e.g., customer), or a combination thereof. An example of this page-based cost determination is described in connection with FIG. 7.

In some examples, the individual cost for a given printing device 218 may be determined on a volume basis. For example, a cost-per-volume of print substance consumed may be based on a quantity of print substance consumed, an end-user, or a combination thereof. An example of this volume-based cost determination is described in connection with FIG. 8.

In some examples, the cost for each printing device 218 may be determined based on the consumption signals 212 and the device ID 224. The cost for each printing device 218 may vary based on the device ID 224. For example, different types of printing devices 218 may be associated with different costs. Therefore, the cost for an amount of consumed print substance may vary based on the types of printing devices 218.

In some examples, the cost for each printing device 218 may be determined based on the consumption signals 212 and the customer ID 226. The cost for each printing device 218 may vary based on the customer ID 226. For example, different customers may be associated with different costs (based on their contracts, for instance). Therefore, the cost for an amount of consumed print substance for a given customer may vary from an amount of consumed print substance for another customer.

In some examples, the cost for each printing device 218 may be determined based on the consumption signals 212 and the print media ID 228. The cost for each printing device 218 may vary based on the print media ID 228. For example, different print media (e.g., paper sizes, paper types) may be associated with different costs.

In some examples, the cost for each printing device 218 may be determined based on the consumption signals 212 and the print mode. The cost for each printing device 218 may vary based on the print modes used by the printing devices 218. For example, different print modes may be associated with different costs. The cost generator 222 may receive signals indicative of print modes used by the plurality of printing devices 218. The cost generator 222 may generate cost signals 229 indicative of the cost for each printing device 218 based on the print modes used by the plurality of printing devices 218.

Upon generating the cost corresponding to the amount of print substance consumed by each printing device 218 of the plurality of printing devices 218, the cost generator 222 may transmit cost signals 229 indicative of the cost for each printing device 218. In some examples, the cost signals 229 may be included in a report sent to a service provider and/or the customer. In some examples, the cost signals 229 may be sent to an accounting engine and later used for billing and/or reconciliation of actual consumed print substance to paid print substance.

The processor 204 may also implement a supply tracker 223. The supply tracker 223 may receive signals indicative of a supply ID. For example, a given common print substance supply 219 may be associated with a given supply ID. The printing device 218 may store the supply ID of the common print substance supply 219 used to fill the printing device 218. The printing device 218 may then report the supply ID to the supply tracker 223.

The supply tracker 223 may track the common print substance supply 219 used to fill a subset of the plurality of printing devices 218 based on the supply ID. For example, the supply tracker 223 may identify which printing devices 218 have been filled with which common print substance supply 219.

Figure 3:
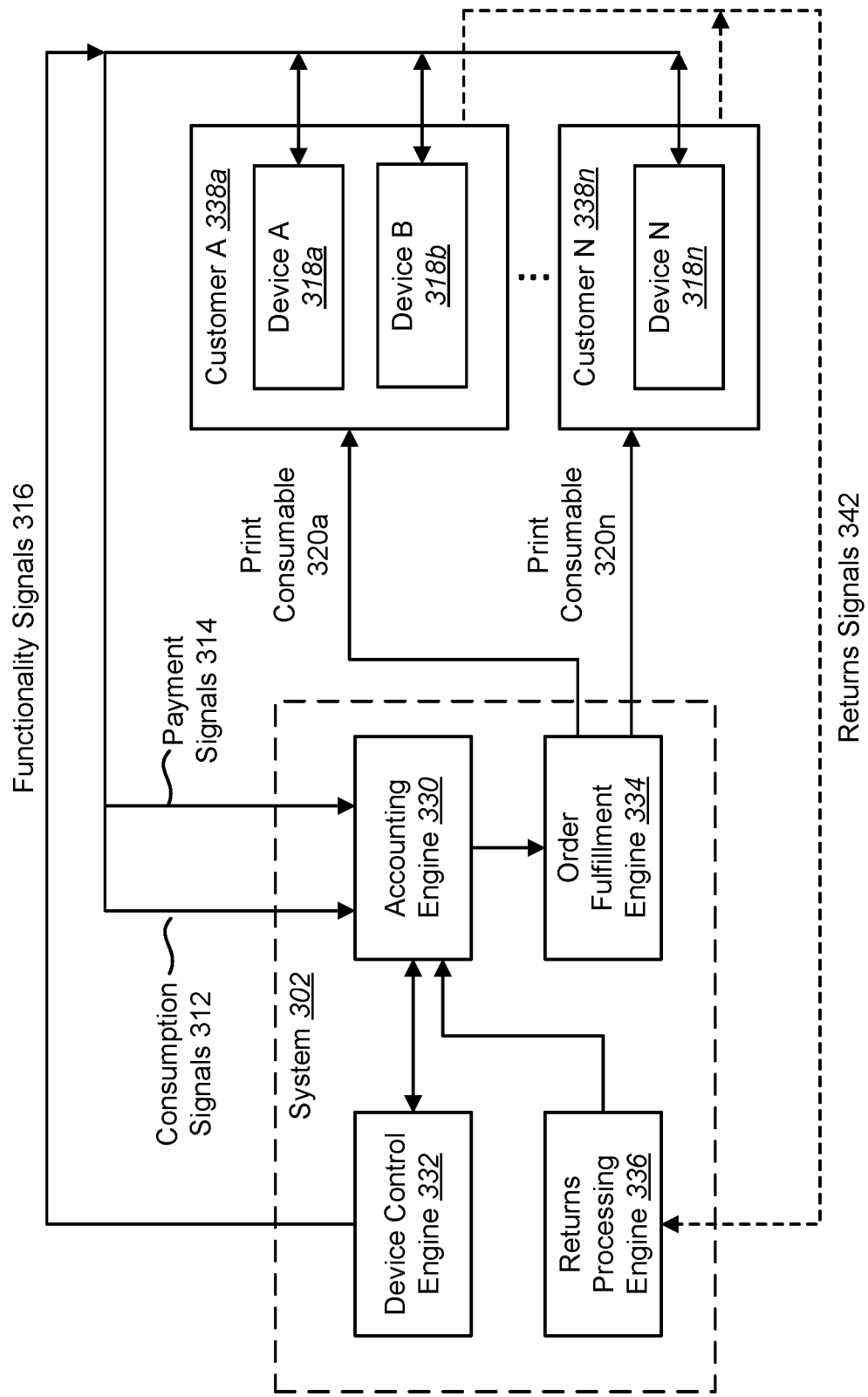
FIG. 3 is an example block diagram illustrating a system for monitoring print consumption and payment.

FIG. 3 is an example block diagram illustrating a system 302 for monitoring print consumption and payment. In FIG. 3, printing device A 318a and printing device B 318b (collectively, printing devices 318) may be associated with customer A 338a. Printing device N 318n may be associated with customer N 338n. As referred to herein, customer A 338a and customer N 338n may be referred to collectively as customers 338. It should be noted that a customer may be associated with any number of printing devices.

The system 302 may include a number of engines to monitor print consumption and payment. It should be noted that the system 302 may include a single computer or may include multiple discrete devices.

The system 302 may include an accounting engine 330. The accounting engine 330 may receive consumption signals 312 and/or payment signals 314 from the printing devices 318. In some examples, payment signals 314 may be received at the accounting engine 330 from an external source such as a financial institution once paid by a customer, such as customer A 338a. The accounting engine 330 may determine whether a print consumable, such as print consumable 320a or print consumable 320n (collectively referred to herein as print consumables 320), has been paid for based on the consumption signals 312 and the payment signals 314. The accounting engine 330 may instruct the device control engine 332 to alter functionality of the printing devices 318 (e.g., add print features) based on the consumption signals 312 and the payment signals 314. This may be accomplished as described above, in relation to FIG. 1.

The device control engine 332 may communicate functionality signals 316 to printing devices 318. The device control engine 332 may be implemented in accordance with the printing device functionality engine 110 described in connection with FIG. 1. Upon receiving the functionality signals 316, the printing device 318 may alter its functionality in accordance with the functionality signals 316.

The accounting engine 330 may also communicate with an order fulfillment engine 334. The order fulfillment engine 334 may authorize or reject shipments of an additional amount of print consumable 320 based on the consumption signals 312 and the payment signals 314. This may be accomplished as described in connection with FIG. 1. It should be noted that in some cases, the print consumable 320 may be provided to the customer in a common print substance supply (e.g., universal supply).

In an example, if the accounting engine 330 confirms consumption and payment for the amount of utilized print consumable by customer A 338a, then the order fulfillment engine 334 may authorize a shipment of an additional amount of print consumable 320a to customer A 338a. Similarly, if the accounting engine 330 confirms consumption and payment for the amount of utilized print consumable by customer N 338n, then the order fulfillment engine 334 may authorize a shipment of an additional amount of print consumable 320n to customer N 338n.

The returns processing engine 336 may track supply recycling and returns. For example, empty print consumable containers may be recycled and/or returned to the service provider. The returns processing engine 336 may receive returns signals 342 from the customers 338. The returns signals 342 may be indicative of print consumable supply recycling and returns. The returns processing engine 336 may inform the accounting engine 330 of print consumable supply recycling and returns to apply credits to the customer during invoicing. Non-recycled or non-returned print consumable supplies (e.g., containers) may incur penalties to the customers 338.

Figure 4:
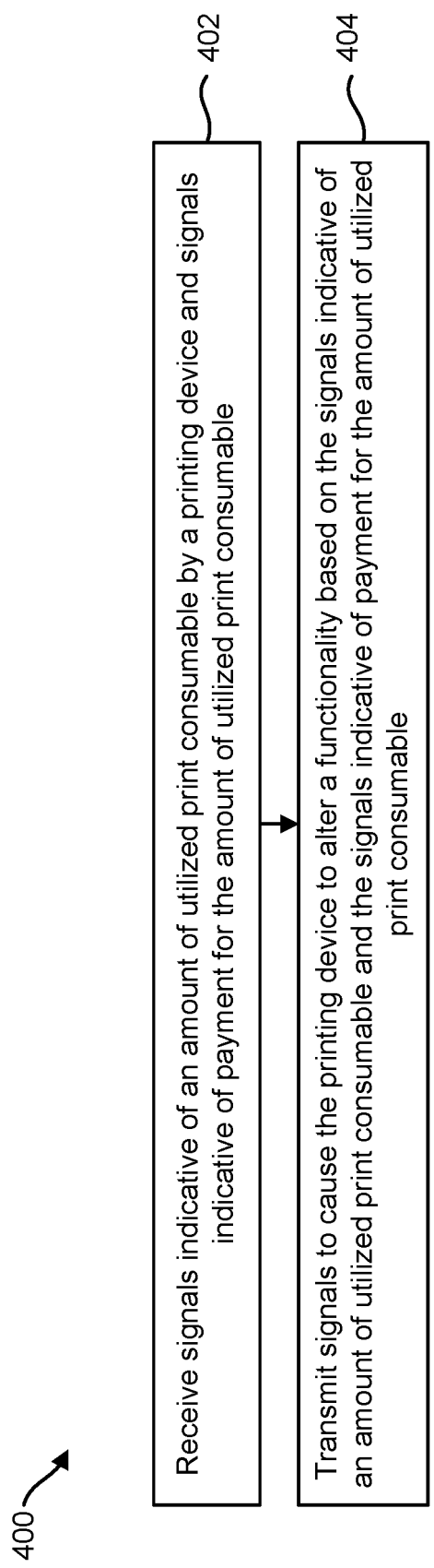
FIG. 4 is an example flow diagram illustrating a method for determining printing device functionality based on consumption and payment.

FIG. 4 is an example flow diagram illustrating a method 400 for determining printing device functionality based on consumption and payment. A computing device 102 may receive 402 signals 112 indicative of an amount of utilized print consumable 120 by a printing device 118 and signals 114 indicative of payment for the amount of utilized print consumable 120. For example, the printing device 118 may periodically report consumption of a print consumable 120 automatically (e.g., via the internet). In another example, the consumption of the print consumable 120 may be manually reported (e.g., by a customer or service provider) to the computing device 102. The received payment signals 114 may indicate whether the amount of utilized print consumable 120 has been paid for or not.

The computing device 102 may transmit 404 signals 116 to cause the printing device 118 to alter a functionality based on the signals 112 indicative of an amount of utilized print consumable 120 and the signals 114 indicative of payment for the amount of utilized print consumable. For example, the signals 116 to cause the printing device 118 to alter a functionality may include signals to cause the printing device 118 to add print features.

Figure 5:
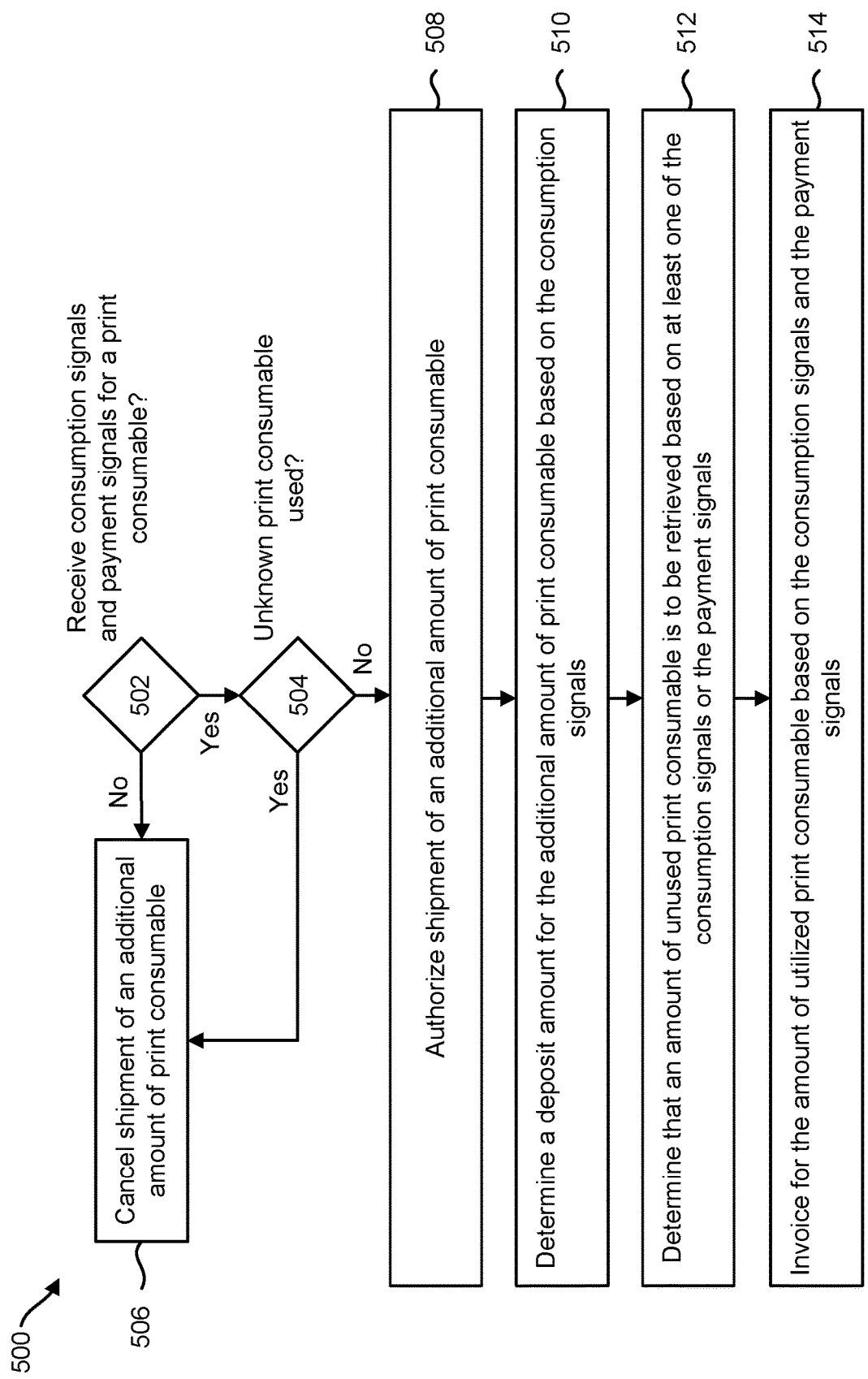
FIG. 5 is an example flow diagram illustrating a method for authorizing shipment of an additional amount of print consumable.

FIG. 5 is an example flow diagram illustrating a method 500 for authorizing shipment of an additional amount of print consumable 120. A computing device 102 may determine 502 whether consumption signals 112 and payment signals 114 for a print consumable 120 were received. If the computing device 102 fails to receive either the consumption signals 112 or payment signals 114, then the computing device 102 may cancel 506 shipment of an additional amount of print consumable 120.

If the computing device 102 determines 502 that consumption signals 112 and payment signals 114 were received, then the computing device 102 may determine 504 whether an unknown print consumable 120 was used by a printing device 118. If an unknown print consumable 120 was used by a printing device 118, then the computing device 102 may cancel 506 shipment of an additional amount of print consumable 120. The computing device 102 may alter the functionality of the printing device 118 to accommodate the unknown print consumable 120.

If the computing device 102 determines 504 that a known print consumable 120 was used, then the computing device 102 may authorize 508 shipment of an additional amount of print consumable 120. For example, the computing device 102 may calculate the additional amount of print consumable 120 to ship based on the consumption signals 112.

The computing device 102 may determine 510 a deposit amount for the additional amount of print consumable 120 based on the consumption signals 112. For example, the computing device 102 may determine 510 a deposit amount to cover shipping and handling of the additional amount of print consumable 120.

The computing device 102 may determine 512 that an amount of unused print consumable 120 is to be retrieved based on the consumption signals 112 and/or the payment signals 114. For example, if the consumption signals 112 indicate that the printing device 118 has not used the print consumable 120 within a certain time period and the payment signals 114 indicate that payment for the print consumable 120 has not been received, then the computing device 102 may issue a message to retrieve the unused print consumable 120. In another example, the computing device 102 may determine to retrieve unused print consumables 120 at the end-of-contract based on the consumption signals 112.

The computing device 102 may invoice 514 for the amount of utilized print consumable based on the consumption signals 112 and the payment signals 114. For example, the computing device 102 may determine that an amount of print consumable 120 has been used based on the consumption signals 112. The computing device 102 may determine that the used amount of print consumable 120 has not been paid for by the customer based on the payment signals 114. The computing device 102 may then generate a statement requesting payment for any amount of print consumable 120 that has not been paid for by the customer. In some examples, a grace period may be offered to enable printing to continue uninterrupted during delays in payment.

Figure 6:
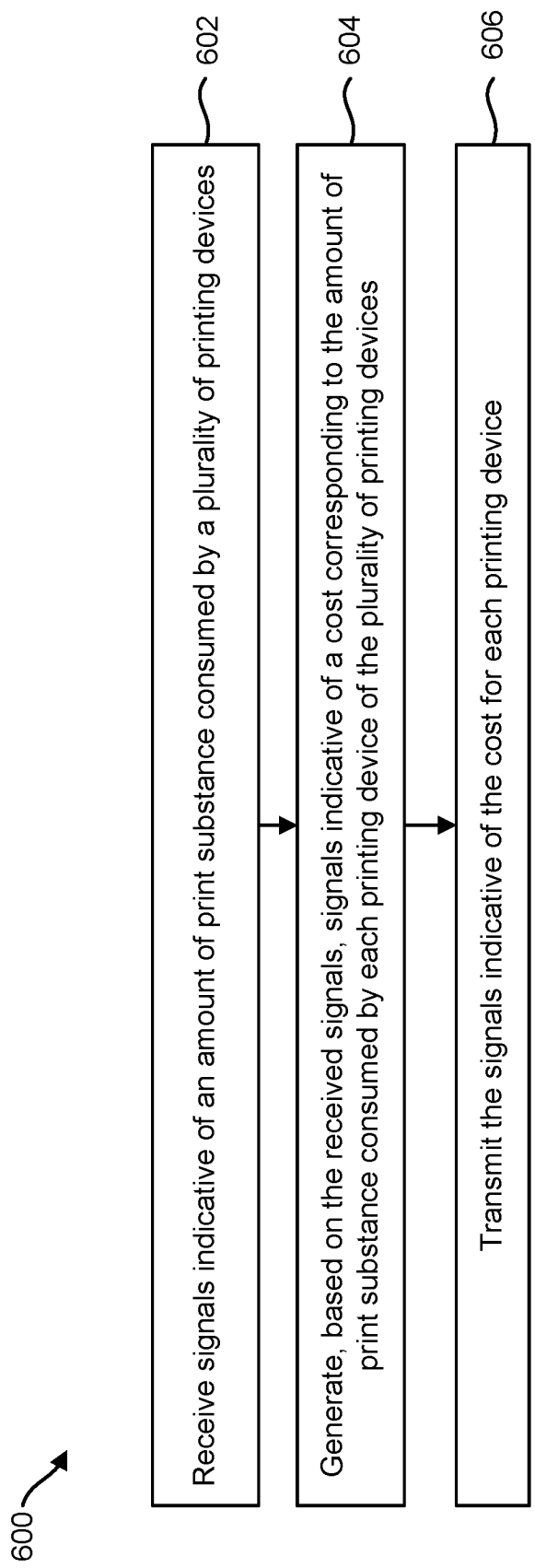
FIG. 6 is an example flow diagram illustrating a method for cost generation for a common print substance supply.

FIG. 6 is an example flow diagram illustrating a method 600 for cost generation for a common print substance supply 219. A computing device 202 may receive 602 signals 212 indicative of an amount of print substance consumed by a plurality of printing devices 218. For example, each printing device 218 may periodically report consumption signals 212 automatically (e.g., via the internet) or manually (e.g., by a customer or service provider).

The computing device 202 may generate 604, based on the received signals 212, signals 229 indicative of a cost corresponding to the amount of print substance consumed by each printing device 218 of the plurality of printing devices 218. The cost is also generated based on a device ID 224, a customer ID 226, a print media ID 228, or a combination thereof.

In some examples, cost may be generated on a page basis. For example, the computing device 202 may receive a consumption signal 212 that includes a number of parameters including the number of pages printed and/or the print mode used. The computing device 202 may determine a cost-per-page based on the number of pages, the size of pages, the type of printing device 218, the end-user (e.g., customer) and/or print mode indicated in the consumption signal 212. The computing device 202 may determine a cost-per-page based on a mapping of the parameters included in the consumption signal 212 to costs.

In some examples, cost may be generated on a volume basis. For example, the computing device 202 may receive a consumption signal 212 that includes a volume of print substance used (in milliliters, for instance). The computing device 202 may determine a cost-per-volume based on the volume of print consumable used, the type of printing device 218 and/or the end-user (e.g., customer). The computing device 202 may determine a cost-per-volume based on a mapping of the parameters included in the consumption signal 212 to a volumetric cost (e.g., cost-per-volume).

The computing device 202 may transmit 606 the signals 229 indicative of the cost for each printing device 218. The individual costs for different printing devices 218 may be the same or may be different.

Figure 7:
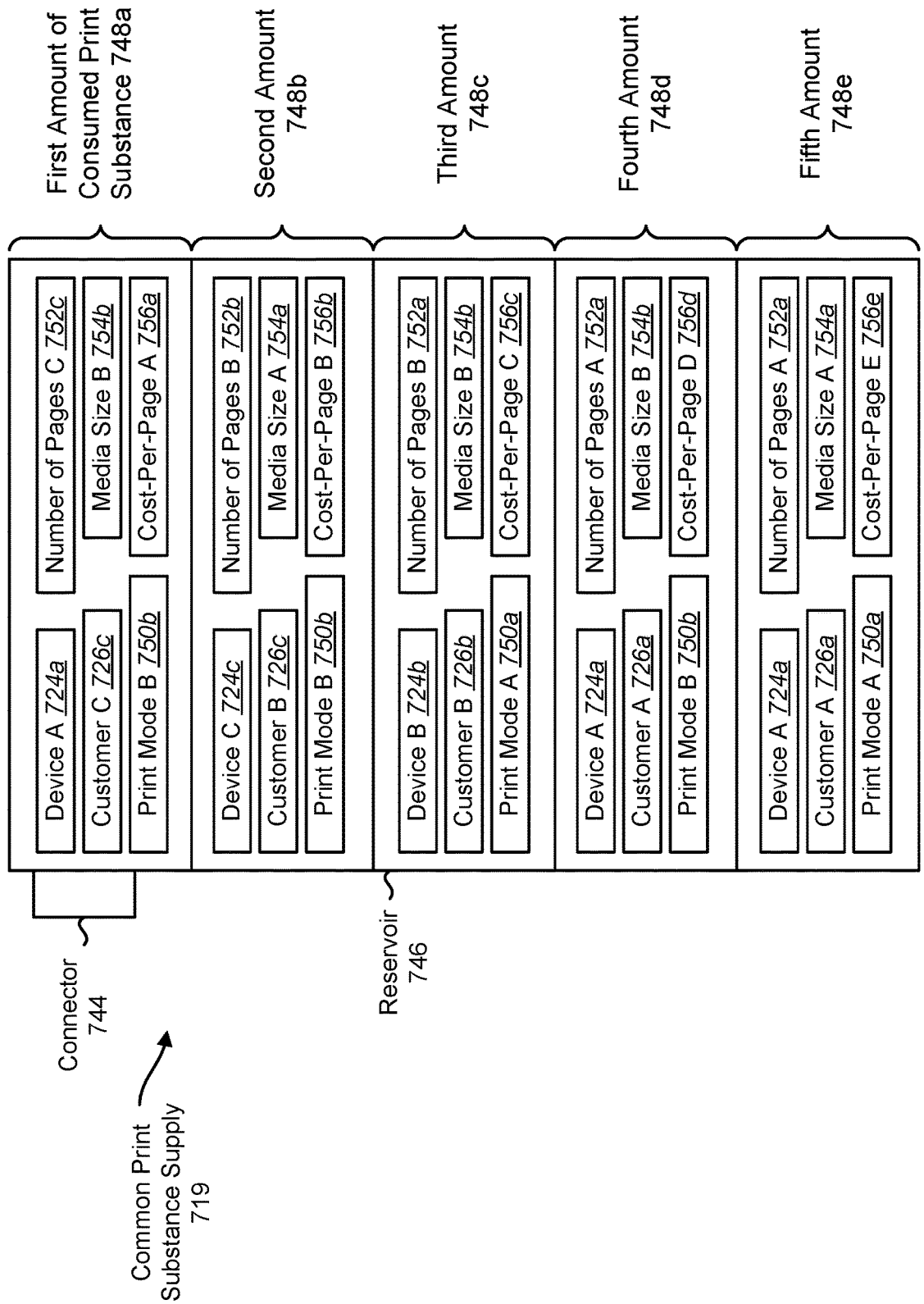
FIG. 7 is an example of a page-based cost determination for a common print substance supply.

FIG. 7 is an example of a page-based cost determination for a common print substance supply 719. The common print substance supply 719 may include a reservoir 746 to hold a volume of print substance (e.g., ink, toner, etc.). In some examples, the common print substance supply 719 may include a connector 744 to interface with multiple printing devices. In some examples, the common print substance supply 719 may include multiple connectors 744 to interface with multiple printing devices. As illustrated in FIG. 7, different amounts of consumed print substance (e.g., first, second, third, fourth, and fifth amounts of consumed print substance 748a-748e, collectively different amounts of consumed print substance 748) may be transferred from the common print substance supply 719 to different printing devices.

Each amount of consumed print substance 748 may be associated with a number of parameters: device ID (e.g., device ID 724a-c, collectively device IDs 724), customer ID (e.g., customer ID 726a-c, collectively customer IDs 726), print mode (e.g., print mode 750a and 750b, collectively print modes 750), a number of pages printed (e.g., number of pages printed 752a-c, collectively numbers of pages printed 752) and the media size (e.g., media size 754a and 754b, collectively media sizes 754). The cost-per-page (e.g., cost-per-page 756a-e, collectively costs-per-page 756) for a given amount of consumed print substance (e.g., first amount of consumed print substance 748a) may be determined for the combination of parameters associated with the given amount of the first amount of consumed print substance 748a.

In the example illustrated in FIG. 7, five different amounts of consumed print substance 748 are depicted. Each of the five different amounts of consumed print substance 748 have different combinations of parameters. As such, costs-per-page 756a-e may vary.

Figure 8:
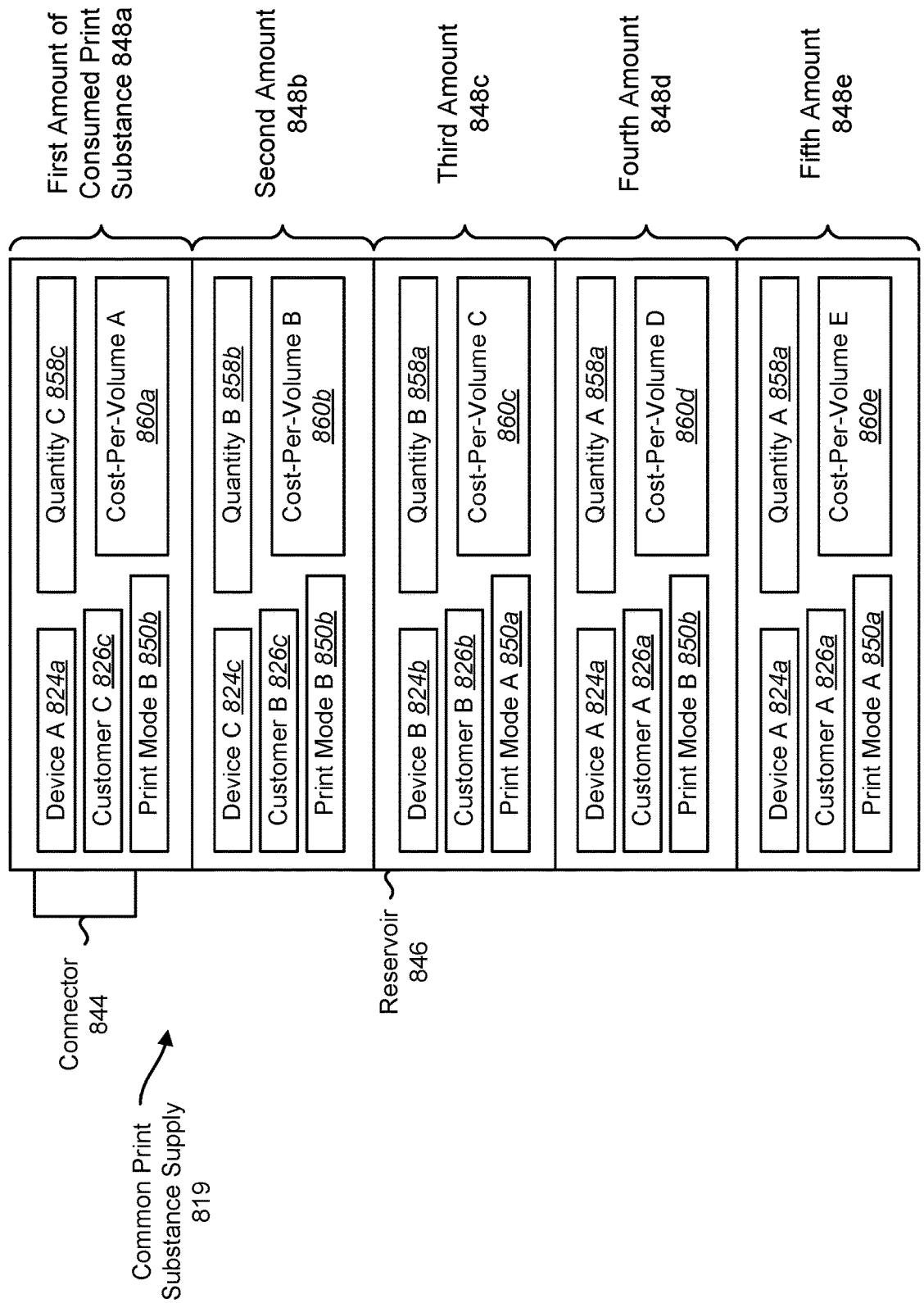
FIG. 8 is an example of a volume-based cost determination for a common print substance supply.

FIG. 8 is an example of a volume-based cost determination for a common print substance supply 819. The common print substance supply 819 may include a reservoir 846 to hold a volume of print substance (e.g., ink, toner, etc.). The common print substance supply 819 may include a connector 844 to interface with multiple printing devices. As illustrated in FIG. 8, different amounts of consumed print substance (e.g., first, second, third, fourth, and fifth amounts of consumed print substance 848a-848e, collectively different amounts of consumed print substance 848) may be transferred from the common print substance supply 819 to different printing devices.

Each amount of consumed print substance 848 may be associated with a number of parameters: device ID (e.g., device ID 824a-c, collectively device IDs 824), customer ID (e.g., customer ID 826a-c, collectively customer IDs 826), print mode (e.g., print mode 850a and 850b, collectively print modes 850), and quantity of print substance used (e.g., quantity 858a-c, collectively quantity 858). The cost-per-volume (e.g., cost-per-volume 860a-e, collectively cost-per-volume 860) for a given amount of consumed print substance (e.g., first amount of consumed print substance 848a) may be determined for the combination of parameters associated with the given amount the first amount of consumed print substance 848a. The cost-per-volume 860 may be expressed as a cost-per-milliliter.

In the example illustrated in FIG. 8, five different amounts of consumed print substance 848 are depicted. Each of the five different amounts of consumed print substance 848 have different combinations of parameters. As such, cost-per-volume 860a-e may vary.

The invention claimed is:

1. A method comprising:
receiving, at a computing device, signals indicative of an amount of utilized print consumable by a printing device and signals indicative of payment for the amount of utilized print consumable;
transmitting, by the computing device, signals to cause the printing device to alter a functionality based on the signals indicative of an amount of utilized print consumable and the signals indicative of payment for the amount of utilized print consumable; and
canceling shipment of an additional amount of print consumable in response to any of:
a failure to receive either or both of the signals indicative of the amount of utilized print consumable and the signals indicative of the payment for the amount of utilized print consumable;
a determination that an unknown print consumable is used by the printing device; or
a failure to consume the print consumable by the printing device.

2. The method of claim 1, wherein the signals to cause the printing device to alter a functionality comprise signals to cause the printing device to add print features.

3. The method of claim 1, further comprising authorizing the shipment of the additional amount of print consumable in response to confirming consumption and the payment for the amount of utilized print consumable.

4. The method of claim 3, wherein the signals indicative of the payment comprise signals indicative of receipt of the payment,
and wherein the amount of utilized print consumable is consumed before the payment is made.

5. The method of claim 3, further comprising determining a deposit amount for the additional amount of print consumable based on the signals indicative of the amount of utilized print consumable.

6. The method of claim 1, wherein the shipment of the additional amount of print consumable is specifically canceled in response to the failure to receive either or both of the signals indicative of the amount of utilized print consumable and the signals indicative of the payment for the amount of utilized print consumable.

7. The method of claim 1, wherein the shipment of the additional amount of print consumable is specifically canceled in response to the determination that the unknown print consumable is used by the printing device.

8. The method of claim 1, wherein the shipment of the additional amount of print consumable is specifically canceled in response to the failure to consume the print consumable by the printing device.

9. The method of claim 1, further comprising determining, at the computing device, that an amount of unused print consumable is to be retrieved based on either or both of the signals indicative of the amount of utilized print consumable and the signals indicative of the payment for the amount of utilized print consumable.

10. The method of claim 1, further comprising invoicing for the amount of utilized print consumable based on the signals indicative of the amount of utilized print consumable and the signals indicative of the payment for the amount of utilized print consumable.

11. A computing device comprising:
a memory;
a processor coupled to the memory, wherein the processor is to:
receive signals indicative of an amount of utilized print consumable by a printing device and signals indicative of payment for the amount of utilized print consumable;
transmit signals to cause the printing device to alter a functionality based on the signals indicative of an amount of utilized print consumable and the signals indicative of payment for the amount of utilized print consumable;
determine a deposit amount for an additional amount of print consumable based on the signals indicative of the amount of utilized print consumable; and
authorizing shipment of the additional amount of print consumable in response to confirming consumption and the payment for the amount of utilized print consumable.

12. The computing device of claim 11, wherein the signals to cause the printing device to alter a functionality comprise signals to cause the printing device to add print features.

13. A non-transitory machine-readable storage medium encoded with instructions executable by a processor to perform processing, comprising:
receiving signals indicative of an amount of utilized print consumable by a printing device and signals indicative of receipt of payment for the amount of utilized print consumable, wherein the amount of utilized print consumable is consumed before the payment is made; and
transmitting signals to cause the printing device to alter a functionality based on the signals indicative of an amount of utilized print consumable and the signals indicative of payment for the amount of utilized print consumable.

14. The machine-readable storage medium of claim 13, wherein the signals to cause the printing device to alter a functionality comprise signals to cause the printing device to add print features.

15. The machine-readable medium of claim 13, wherein the processing further comprises:
canceling shipment of an additional amount of print consumable in response to a failure to receive either or both of the signals indicative of the amount of utilized print consumable and the signals indicative of the payment for the amount of utilized print consumable.

16. The machine-readable medium of claim 13, wherein the processing further comprises:
canceling shipment of an additional amount of print consumable in response to determining that an unknown print consumable is used by the printing device.

17. The machine-readable medium of claim 13, wherein the processing further comprises:
canceling shipment of an additional amount of print consumable in response to a failure to consume the print consumable by the printing device.

18. The machine-readable medium of claim 13, wherein the processing further comprises:
determine a deposit amount for an additional amount of print consumable based on the signals indicative of the amount of utilized print consumable; and
authorizing shipment of the additional amount of print consumable in response to confirming consumption and the payment for the amount of utilized print consumable.

* * * * *